United States Patent [19]

Bampton

[11] Patent Number: 4,890,784

[45] Date of Patent: Jan. 2, 1990

[54] METHOD FOR DIFFUSION BONDING ALUMINUM

[75] Inventor: Clifford C. Bampton, Thousand Oaks, Calif.

[73] Assignee: Rockwell International Corporation, El Segundo, Calif.

[21] Appl. No.: 479,225

[22] Filed: Mar. 28, 1983

[51] Int. Cl.$^4$ .............................................. B23K 20/14
[52] U.S. Cl. ................................... 228/194; 228/198; 228/263.17
[58] Field of Search ............... 228/194, 195, 198, 203, 228/263.17, 217; 148/12.7 A

[56] References Cited

U.S. PATENT DOCUMENTS

| | | | |
|---|---|---|---|
| 2,095,807 | 10/1937 | Gier | 113/112 |
| 3,180,022 | 4/1965 | Briggs | 29/487 |
| 3,339,269 | 9/1967 | Hanink | 29/488 |
| 3,373,482 | 3/1968 | Miller | 29/501 |
| 3,373,483 | 3/1968 | Miller | 29/501 |
| 3,581,382 | 6/1971 | Wells et al. | 29/498 |
| 3,678,570 | 7/1972 | Paulonis et al. | 29/498 |
| 3,935,986 | 2/1976 | Lattari et al. | 228/194 X |
| 3,937,387 | 2/1976 | Fletcher et al. | 228/238 |
| 3,993,238 | 11/1976 | Brook et al. | 228/198 |
| 4,005,988 | 2/1977 | Paulonis et al. | 228/194 |
| 4,046,305 | 9/1977 | Brown et al. | 228/194 |
| 4,122,992 | 10/1978 | Duvall et al. | 228/194 X |
| 4,174,232 | 11/1979 | Lenz et al. | 148/12.7 A |
| 4,222,797 | 9/1980 | Hamilton et al. | 148/12.7 A |
| 4,240,574 | 12/1980 | Schmatz et al. | 278/217 |
| 4,331,286 | 5/1982 | Tamamura et al. | 228/198 |

OTHER PUBLICATIONS

Metal Handbook, 9th Ed., 1973, ASM Handbook Committee, page 65, Aluminum 1100.

Primary Examiner—Kenneth J. Ramsey
Attorney, Agent, or Firm—Charles T. Silberberg

[57] ABSTRACT

Diffusion bonding of aluminum alloys is performed using a thin alloy interlayer placed between mating surfaces of the alloy members to be bonded, the interlayer having a specific composition which is dependent upon the composition of the alloy members, the diffusion bonding temperature, the interdiffusion rates of the alloy members compared with the interlayer, and the solid state diffusion rate of the interlayer into the alloy members. The process is preferably further characterized by isothermal solidification of the interlayer after the diffusion bonding temperature has been reached.

26 Claims, 2 Drawing Sheets

METHOD FOR DIFFUSION BONDING ALUMINUM

BACKGROUND OF THE INVENTION

The invention relates to the diffusion bonding together of two or more aluminum alloy members by utilizing at the joint interface a thin interlayer of alloy having a specific composition.

Diffusion bonding is the metallurgical joining of two or more members by the application of temperature and pressure for a time sufficient to cause commingling of the molecules at the joint interface. The mating surfaces must be brought into direct and intimate contact, so that sufficient molecular movement will result to create the bond. Hence, as conventionally utilized, diffusion bonding is a two stage process. Initially, mechanical means are used to insure the direct and intimate contact. In the second stage, the homogeneous bond is created by diffusion: the movement of molecules across the joint interface.

Since diffusion rates at room temperature are extremely low, diffusion bonding is usually performed at elevated temperatures. The elevated temperatures are typically below the melting point of the lowest base metal, but sufficiently high to encourage diffusion to occur.

The principal effects of elevated pressure as applied to the members to be joined are better contact and more molecular interaction. Oftentimes, this is required to produce a stronger bond.

Diffusion bonding is preferred over other conventional joining techniques, such as fusion welding which forms large volumes of cast metal or pressure welding which causes bulk deformation and recrystallization. In diffusion bonding, the mechanical and metallurgical properties of the bond most nearly resemble the properties of the parent metal.

The surface conditions of the alloy members to be joined are critical to insure direct contact and to eliminate films that act as surface barriers. The surfaces to be joined must be scrupulously clean and free of oxides and other surface contamination. The alloys of aluminum are particularly susceptible to the formation of a tenacious oxide layer, when exposed to air. Even though aluminum has certain physical characteristics in addition to cost, that make it extremely attractive in alloy fabrication, the major obstacle of diffusion bonding aluminum alloys is related to removing the surface oxides and preventing them from reforming at the joint interface.

Recent technical advances have demonstrated that the reduction of grain size improves some of the physical properties of most structural materials (see, for example, U.S. Pat. 4,092,181). A fine grain size is also beneficial to diffusion bonding. This is because the greater grain boundary area of fine grain materials significantly increases the diffusive flow processes which are essential to diffusion bonding. It may also be of economic and practical advantage to be able to carry out sequential or concurrent superplastic forming and diffusion bonding. This is possible in fine grain alloys, where the operating temperature ranges for the two processes coincide. It is an aim of this invention to be able to carry out superplastic forming and diffusion bonding of fine grain processed high strength aluminum alloys, such as 7475 Al.

One modern variation of diffusion bonding involves the use of a thin metallic surface layer between the surfaces to be joined which gives rise to a transient liquid phase therebetween. The thin surface layers are used for a variety of reasons. An easily cleaned interlayer material will assist the bonding of difficult to clean surfaces. If the interlayer material is pliable, it will result in larger surface contact areas at a given pressure, thereby promoting diffusion rates. Foreign atoms or molecules in a surface layer may diffuse more rapidly than the substrate alloy. A surface layer can also be useful in restricting interdiffusion, thereby eliminating undesirable intermetallic compounds.

SUMMARY

One primary object of the subject invention is to provide a new method of producing diffusion bonded aluminum structures.

Another object is to provide a new method of diffusion bonding by utilizing a thin interlayer which forms an integral part of the diffusion bonded assembly without any significant change in the composition of the alloy members to be bonded.

Other objects of the invention will become apparent upon reading the following detailed description and upon reference to the drawings.

The concept of coating the surface of metals with lower melting point alloys has been used to aid in metallic bonding. However, with the subject invention a specific alloy interlayer must be used.

The alloy members to be bonded are of a base metal (aluminum) and at least one alloy additive. The interlayer to be used is of an alloy which consists mainly of two elements that dissolve into the base metal, preferably said base metal and one of the alloy additives. It is essential that the main alloying elements in the members to be bonded dissolve in the liquid interlayer, at the diffusion bonding temperature, and thereby cause a rapid rise in the equilibrium melting temperature range of the interlayer alloy. This dissolution is required so that solidification of the interlayer will eventually occur, and so that the resulting diffusion bond is similar in composition to the bonded members.

After the alloy members and the interlayer are assembled, they are heated to the diffusion bonding temperature. The assembly is held at about that temperature for a sufficient period of time to allow the interlayer to solidify eventually, as the contacting surfaces of the members dissolve into the interlayer. After the interlayer has solidified, further holding will allow rapid solid state diffusion away from the bond area so that the bond is further strengthened.

DETAILED DESCRIPTION OF THE INVENTION

It is essential to the present invention that the aluminum alloy in the members to be bonded dissolve in the liquid interlayer, at the diffusion bonding temperature, and thereby, cause a rapid rise in the equilibrium melting temperature range of the interlayer alloy. Hence, it is important that the interlayer alloy have a melting point below the diffusion bonding temperature. Another criteria is that the interlayer alloy have a melting point that rapidly approaches the diffusion bonding temperature as the alloy members to be bonded dissolve into the liquid interlayer. Furthermore, the interlayer alloy must consist of elements that rapidly diffuse into the alloy members at the diffusion bonding temperature, after the interlayer has solidified.

Figure 3:
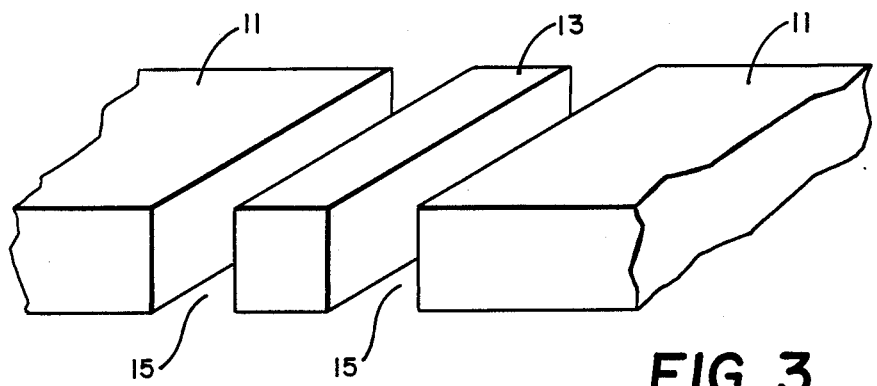
FIG. 3 is an isometric view showing the members to be joined surrounding the interlayer. While the invention will be described in connection with the preferred embodiments, it is not intended to limit the invention to those embodiments. Accordingly, it should be clearly understood that the form of the present invention described herein is illustrative only and is not intended to limit the scope of the invention.

Referring to FIG. 3 the interlayer alloy (which is sandwiched between the mating surfaces 15 of aluminum alloy members to be bonded 11) is chosen such that there is complete miscibility of the major alloying elements of both the interlayer 13 and the members to be bonded 11 in the liquid phase. The weight percentage of aluminum in interlayer 13 is less than the weight percentage of aluminum in the members 11.

If the temperature is stabilized, thermodynamics favor formation of the liquid phase over the solid phase. The base alloy thus dissolves in the liquid phase of the interlayer 13 so that the base and interlayer alloys tend towards the same composition. This continues until the liquid composition reaches the equilibrium liquidus composition for that temperature. Further dissolution of the substrate then causes increasing amounts of interlayer 13 to solidify. The solidifying interlayer material nucleates and grows on the mating surfaces 15. Once formed on the interface, the normal solid-state diffusion processes occur. The concentration differences between the base alloy and the solidified interlayer 13 drive diffusion so that the concentration differences are removed. The solidified interlayer composition, therefore, continually tends towards that of the base alloy. The remaining interlayer liquid also continues towards the base alloy composition by a two-way process of preferential exchange of elements across the solid-liquid interface. This continues until the last remaining liquid reaches the equilibrium solidus composition, when the interlayer becomes entirely solid. This process ideally requires an interlayer alloy which, at the diffusion bonding temperature, has (1) a small composition range between solidus and liquidus. (2) a high solid solubility in the base alloy, and (3) a high solid state diffusivity of the interlayer alloying elements in the base alloy.

Figure 1:
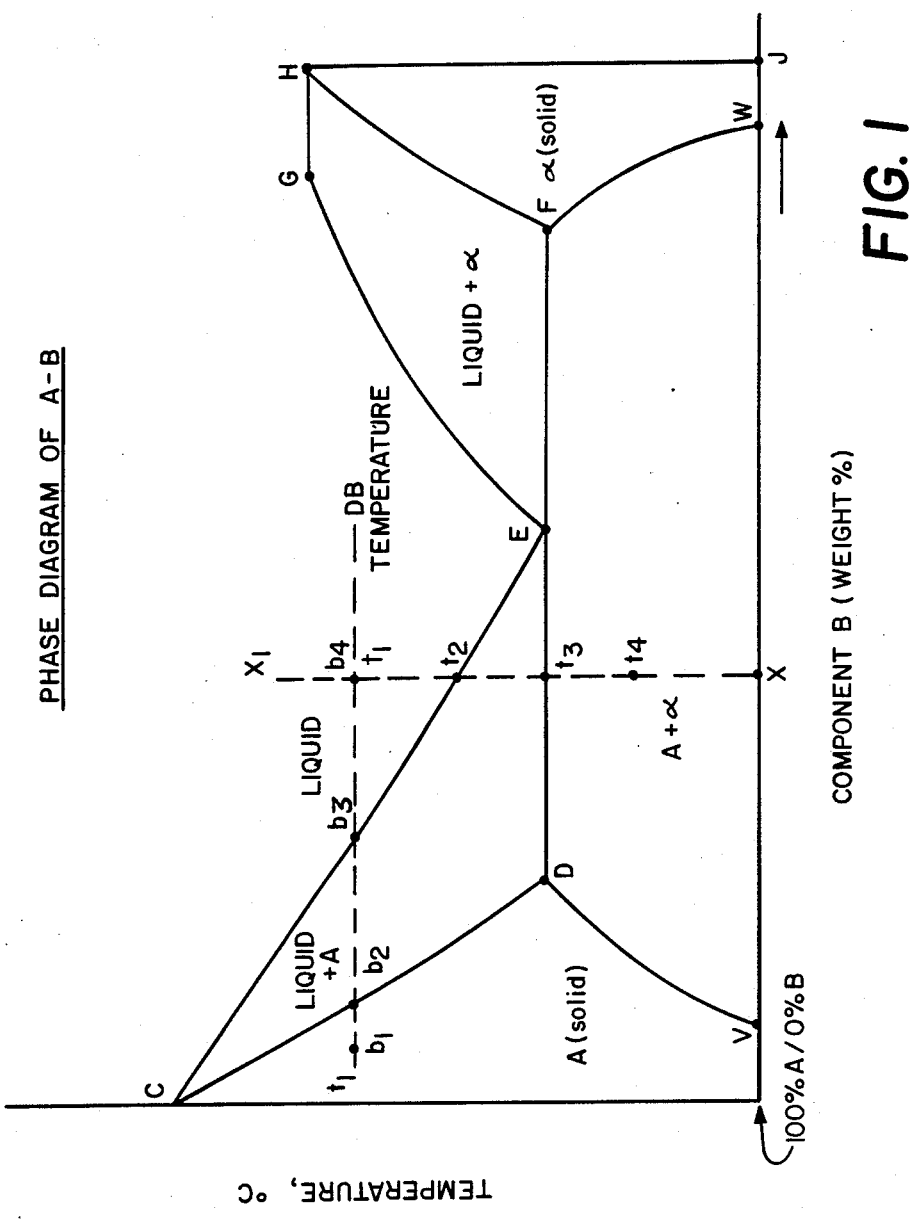
FIG. 1 is an equilibrium phase diagram of an imaginary system of two metals, metal A, and metal B.

Referring to FIG. 1, the assembly with an interlayer alloy $A-X_1$ weight percent B is heated to the preferred diffusion bonding temperature $t_1$. The interlayer is completely liquid at this temperature. Although, the system may work at some temperature between $t_2$ and $t_3$ (mixed solid and liquid phase) a completely liquid interlayer is preferred to insure the disruption of the oxide interlayer that may form on the interlayer surface. As the assembly is held at that temperature, dissolution of the base alloy (which consists primarily of base metal A) occurs into the interlayer alloy. Since the dissolution rate of the base alloy into the interlayer alloy exceeds the diffusion rate of the interlayer alloy into the members to be bonded, significant amounts of base metal A rapidly dissolve into the molten interlayer, changing the composition of the interlayer alloy.

As the percent weight of B in the interlayer is diluted to $b_3$, a solid phase A begins to appear(as the liquidus curve CE is crossed). Although there may be certain advantages to solidifying at a slightly decreasing temperature (solidification occurs more rapidly), substantially isothermal solidification is easier to control and is preferred. At composition $b_2$, the liquid phase has all but disappeared (as the solidus curve CD is crossed). At composition $b_1$, the interlayer is in a solid phase. The temperature is held at $t_1$ while the interlayer alloy rapidly undergoes solid state diffusion into the alloy members. This continues until the composition of the interlayer is similar to the composition of the alloy members, thereby forming a homogeneous diffusion bond and further strengthening of the bond.

It may be noted that in the imaginary phase diagram (FIG. 1). the main requirements for the interlayer alloy have been met:

1. The melting point $t_3$, of $A-x_1$ weight percent B is below the diffusion bonding temperature ($t_1$). It is recommended that the melting point of the interlayer be at least 20° C. below the diffusion bonding temperature of the member to be bonded, i.e. to assure a completely liquid interlayer.
2. The solidus line (CD) and the liquidus line (CE) are steep so that a relatively small change in the percentage composition of the interlayer alloy will change the alloy from the liquid to the solid state. Preferably, the liquidus temperature rises (line CE) at a rate equal to or greater than 5° C. per change in weight percent. Although by definition the slop of the solidus line (CD) will be greater, it is preferred that the concentration gap in the mixed phase region (line CE to CD) be narrow so that at the diffusion bonding temperature, a small change in weight percent will change the composition to its solid state.
3. The dissolution rate of the base alloy into the interlayer must exceed the diffusion rate of the interlayer into the base alloy, so that the interlayer composition moves from $b_4$ to $b_3$ to $b_2$, and finally to $b_1$ (instead of moving to the right of line $x_1$ on the phase diagram) Since generally molecules will move more readily from a solid into a liquid, than from a liquid into a solid, this rate requirement will be satisfied if the interlayer is liquid and the members to be bonded are held in the solid state.

Figure 2:
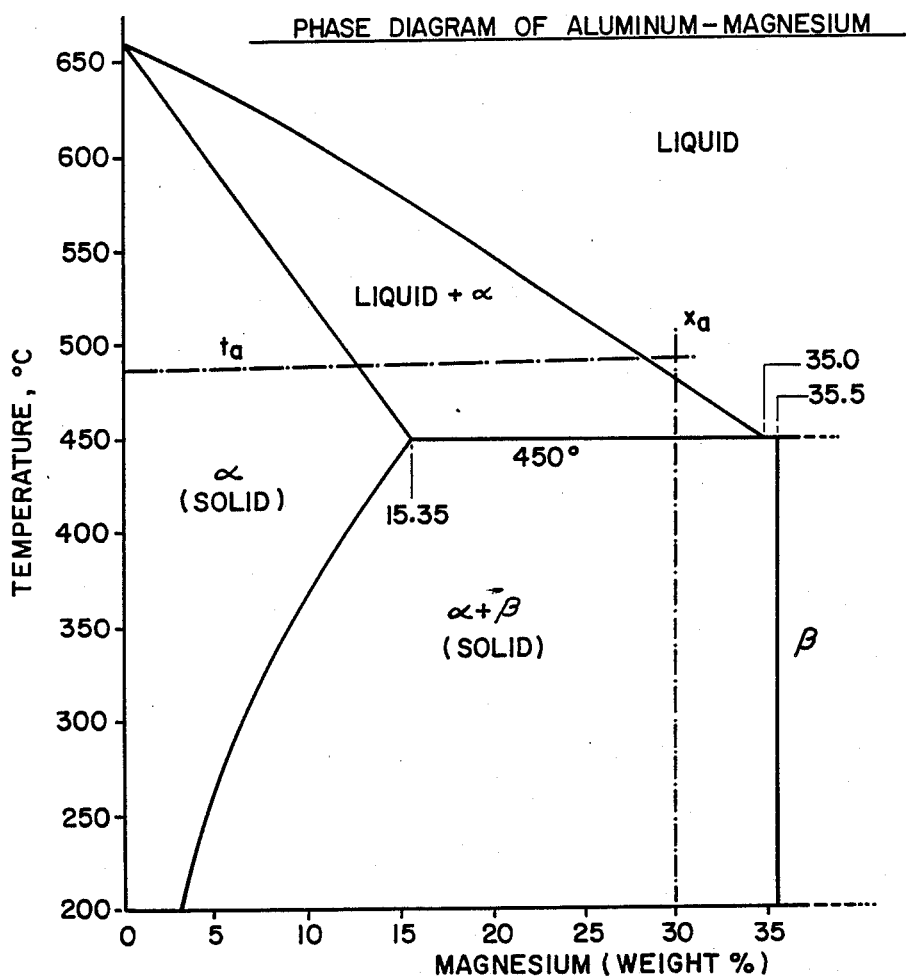
FIG. 2 is a partial equilibrium phase diagram of aluminum and magnesium.

It is preferred that the interlayer consist of about 75% by weight of aluminum, and about 25% by weight of magnesium, as shown in FIG. 2. Although no ternary or quaternary systems have been investigated, it is highly probable that an interlayer having a third or fourth constituent, that satisfies the other criteria of this subject invention, will also produce good results.

Referring to FIG. 2, a partial phase diagram of aluminum-magnesium is shown. The preferred diffusion bonding temperature for a 7475 aluminum alloy is about 516° C. (a range of between 482° and 535° C.). An examination of the aluminum magnesium phase diagram (FIG. 2) reveals that a thin surface layer of the Al-30 weight % Mg (line $X_a$) is completely molten at about 480° C. (line $t_a$), well below this diffusion bonding temperature. Diffusion bonding at 516° C. will disrupt the surface oxide on the 7475 substrates and allow bonding. The method of the subject invention is preferably used in high strength heat treatable aluminum alloys, such as the 2000 series and the 7000 series. Holding at 516° C. will dissolve Al from the members to be bonded into the molten Al-Mg interlayer, decreasing the magnesium content until at about ten percent magnesium, it is completely solid. Further holding will allow rapid solid state diffusion of magnesium away from the bond area so that the bond is further strengthened. It is estimated that the solidification will be completed in two to three hours.

When using the process of the subject invention with aluminum alloys, it is necessary to first chemically clean and degrease the surfaces to be joined. This is needed to remove impurities from the aluminum alloy surface. Alternatively, the entire substrate surface may be treated. Chemical cleaning is conventionally accomplished with a degreasing solvent such as trichloroethylene, naptha, or liquid chlorinated hydrocarbons. The surface may also be chemically etched using a solution of hydrochloric acid, nitric acid, or sulphuric acid. Another chemical cleaning technique involves successive alkali and acid washings.

After the chemical cleaning, the surfaces to be joined are abraided by conventional mechanical means, such as machining, filing, grinding, wire brushing or rubbing with steel wool.

If only selected portion of the surfaces to be joined are to be bonded, a maskant is applied to the aluminum alloy mating surfaces, leaving exposed the areas where diffusion bonding is to occur. The maskant can be an organic material such as "praline".

The surface cleaning procedures described above, will leave a thin surface oxide layer on the surface of the members to be bonded. Unless special steps are taken, the thin interlayer alloy is coated on top of this thin oxide layer. For certain alloys, it is believed that the oxide on the member surface will be disrupted by a liquid interlayer during the first stages of the bonding process. The member dissolution, interlayer dilution, and subsequent isothermal solidification may then occur as described earlier. In these cases, any one of several available methods maybe used to apply the thin interlayer alloy such as thermal spray coating, vapor deposition, electrochemical deposition, sputtering or ion plating.

However, for those alloys requiring removal of the thin substrate oxide, as in the case where the liquid interlayer does not adequately wet the surface oxide to cause disruption of the oxide, a two-stage electrolytic process may be used. In this process the electrolytic cell is designed so that the workpiece is first made the anode in the cell. This causes anodic dissolution of the surface oxide and a small amount of the member surface. The polarity is then switched to immediately commence cathodic plating of the desired alloy interlayer on the clean, bare workpiece surface. This arrangement allows no oxide formation between the member and the surface interlayer. The surface of the interlayer coating will subsequently form an oxide or hydroxide, either while immersed in the electrolyte when the electroplating current is switched off, or on exposure to air after removal from the electrolytic cell. However, this oxide or hydroxide layer will be disrupted during the initial stages of the bonding process, since its foundation (the interlayer) becomes liquid and will be subject to significant distortion or flow, under the applied diffusion bonding pressure. Since the oxide or hydroxide layer is considerably thinner than the interlayer foundation (preferably one third or less) and the oxide or hydroxide layer is brittle, the layer will disrupt into flakes during bonding. The application of diffusion bonding pressure further insures disruption of the layer. Hence, there will be no barriers to metal atom migrations across the member-interlayer interfaces during the bonding process. Furthermore, the disrupted and dispersed oxide flakes will not cause significant degradation of the final diffusion bonded mechanical properties.

Generally, the diffusion bonding pressure will be dependent upon a combination of the following parameters:
1. The diffusion bonding temperature,
2. The flow stress of the material,
3. The time that the materials are held at the diffusion bonding temperature, and
4. A bulk deformation of the bonding members to insure intimate contact of the surfaces to be bonded, typically between 1 and 4%.

After coating with the interlayer alloy, preferably with an interlayer thickness less than ten micrometers, the workpieces are washed, the maskant is removed, the electrolytic solution is removed, and the workpieces are dried. A thin interlayer is preferred, so that the time required for the liquid interlayer to solidify is hastened. The workpieces are then heated to about 516° C. in an argon atmosphere for the diffusion bonding to occur.

Accordingly, there has been provided, in accordance with the invention, a method of diffusion bonding alloys that fully satisfies the objectives set forth above. It is understood that all terms used herein are descriptive rather than limiting. While the invention has been described in conjunction with specific embodiments, it is evident that many alternatives, modifications, and variations will be apparent to those skilled in the art in light of the disclosure herein. Accordingly, it is intended to include all such alternatives, modifications, and variations that fall within the spirit and scope of the appended claims.

I claim:

1. A method of diffusion bonding which comprises:
   providing two aluminum alloy members to be diffusion bonded within a temperature range suitable for solid state diffusion bonding, said aluminum alloy members each having at least one alloy additive therein;
   providing an interlayer of alloy which comprises aluminum and an alloy additive which is also in said alloy members, the percentage of said aluminum in said interlayer being less than the percentage of said aluminum in said alloy members, the percentage of said additive being large enough to assure that said interlayer will be at least partially liquid within said diffusion bonding temperature range for said alloy members, said interlayer having a surface oxide layer, said interlayer having a melting point below said temperature range, said alloy of said members being soluble in said interlayer when said interlayer is in a liquid phase;
   positioning said alloy members and said interlayer in an assembly such that said interlayer is sandwiched between the surfaces of said alloy members to be bonded;
   heating said assembly to within said temperature range such that said interlayer is transformed into a liquid phase and said surface oxide layer disrupted; and
   maintaining said assembly within said temperature range such that portions of said aluminum alloy members dissolve into said interlayer at a faster rate than said interlayer diffuses into said members, said interlayer eventually solidifies between said alloy members primarily due to its resulting increased aluminum content, said diffusion bonding of said alloy members and said interlayer occurs.

2. The method of claim 1 where said maintaining step is such that said interlayer solidifies substantially isothermally.

3. The method of diffusion bonding as recited in claim 2 wherein said interlayer is essentially an aluminum-magnesium alloy.

4. The method of diffusion bonding as recited in claim 3, wherein said interlayer has a thickness of less than ten micrometers.

5. The method of diffusion bonding as recited in claim 4 further comprising removing an oxide layer from the surfaces of the alloy members to be joined prior to placing the interlayer therebetween.

6. The method of claim 5 wherein the liquidus line for the interlayer alloy rises at a rate of at least 5° C. per increase in weight percent of aluminum.

7. The method of claim 4 wherein the liquidus line for the interlayer alloy rises at a rate of at least 5° C. per increase in weight percent of aluminum.

8. The method of diffusion bonding as recited in claim 3 further comprising removing an oxide layer from the surfaces of the alloy members to be joined prior to placing the interlayer therebetween.

9. The method of claim 8 wherein the liquidus line for the interlayer alloy rises at a rate of at least 5° C. per increase in weight percent of aluminum.

10. The method of claim 3 wherein the liquidus line for the interlayer alloy rises at a rate of at least 5° C. per increase in weight percent of aluminum.

11. The method of diffusion bonding as recited in claim 1 wherein the melting point of said interlayer increases as said aluminum alloy members dissolve into said interlayer.

12. The method of claim 1 wherein the melting point of said interlayer is at least 20° C. below the lowest temperature of said temperature range.

13. The method of claim 12 wherein the liquidus line for the interlayer alloy rises at a rate of at least 5° C. per increase in weight percent of aluminum.

14. The method of claim 1 wherein the liquidus line for the interlayer alloy rises at a rate of at least 5° C. per increase in weight percent of aluminum.

15. The method of claim 2 wherein the liquidus line for the interlayer alloy rises at a rate of at least 5° C. per increase in weight percent of aluminum.

16. A method of diffusion bonding as recited in claim 1 wherein said maintaining step is continued to allow said interlayer to diffuse into said aluminum alloy members after solidification of said interlayer such that a homogeneous diffusion bond between said aluminum alloy members results.

17. The method of claim 16 wherein the melting point of said interlayer is at least 20° C. below the lowest temperature of said temperature range.

18. The method of claim 16 wherein the liquidus line for the interlayer alloy rises at a rate of at least 5° C. per increase in weight percent of aluminum.

19. The method of claim 16 wherein said additive of said interlayer has a high solid state diffusity in the alloy of said alloy members.

20. The method of claim 1 wherein said additive of said interlayer has a high solid state diffusity in the alloy of said alloy members.

21. The method of diffusion bonding as recited in claim 1 wherein said alloy of said members is a fine grain alloy.

22. The method of diffusion bonding as recited in claim 1 wherein said alloy additive of said interlayer is magnesium, copper, or zinc.

23. The method of diffusion bonding as recited in claim 1 wherein said surface layer has a thickness of less than ten micrometers.

24. The method of diffusion bonding as recited in claim 1 wherein said diffusion bonding temperature is between 482° to 535° C.

25. The method of diffusion bonding as recited in claim 1 wherein said interlayer is essentially an aluminum-magnesium alloy.

26. The method of diffusion bonding as recited in claim 1 further comprising removing an oxide layer from the surfaces of the alloy members to be joined prior to placing the interlayer therebetween.

* * * * *